(No Model.) 2 Sheets—Sheet 2.
G. WIARD.
HORSE HAY RAKE.
No. 460,612. Patented Oct. 6, 1891.
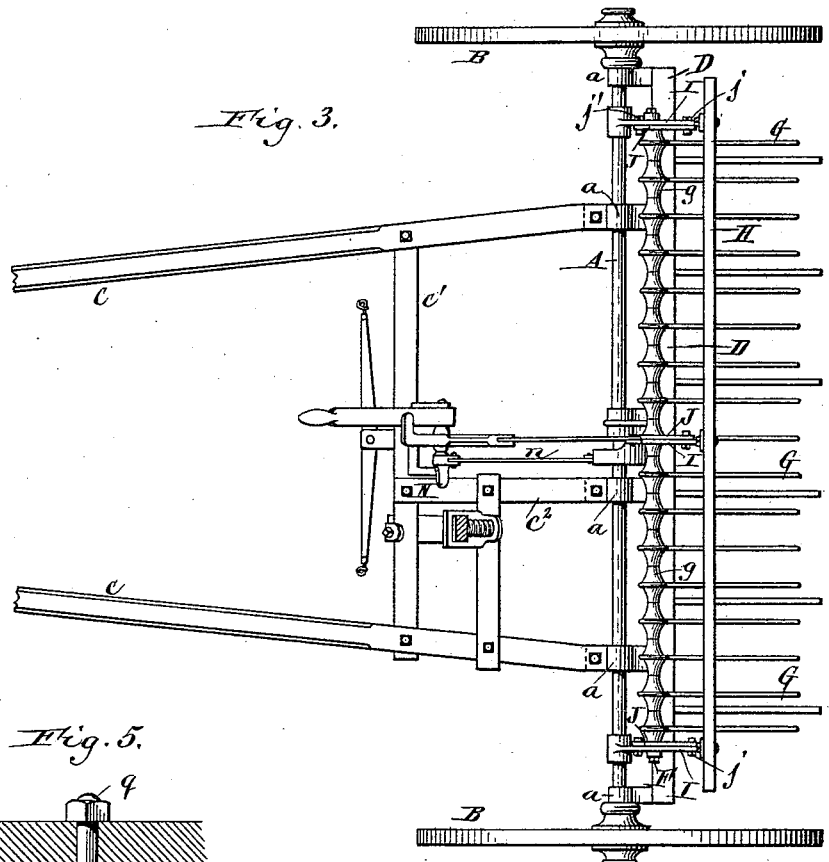
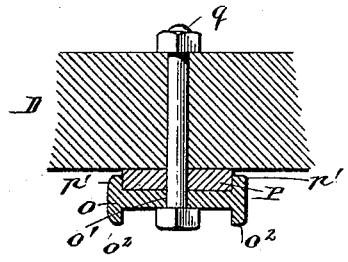
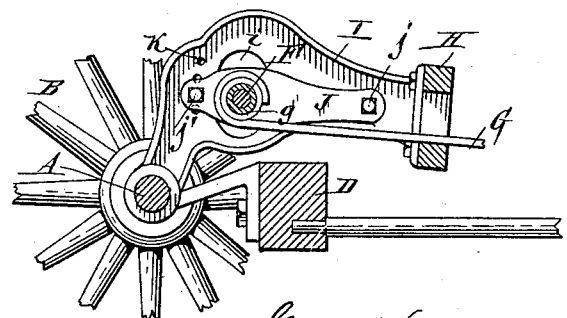

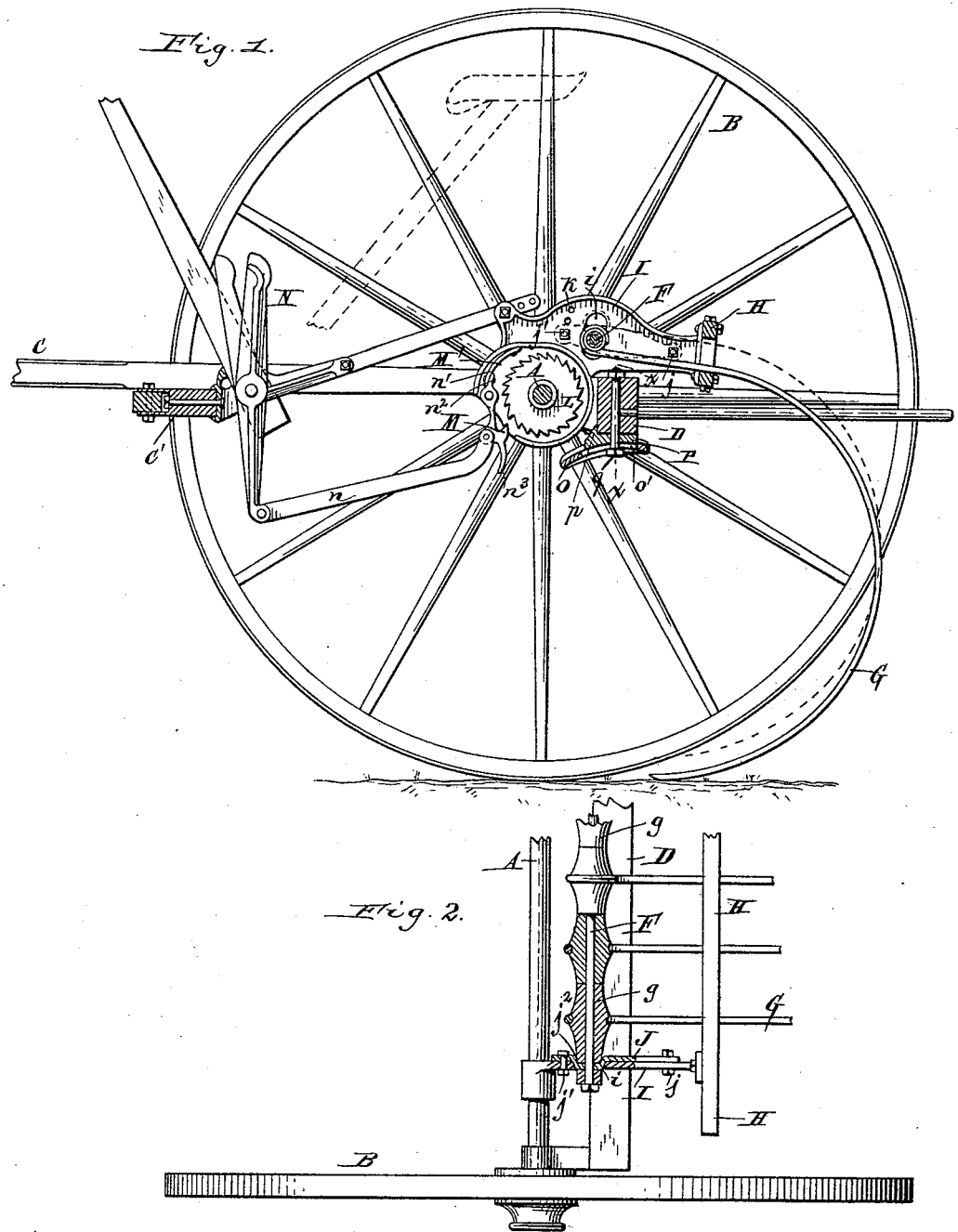

UNITED STATES PATENT OFFICE.

GEORGE WIARD, OF BATAVIA, NEW YORK, ASSIGNOR TO THE WIARD PLOW COMPANY, OF SAME PLACE.

HORSE HAY-RAKE.

SPECIFICATION forming part of Letters Patent No. 460,612, dated October 6, 1891.

Application filed February 24, 1891. Serial No. 382,404. (No model.)

*To all whom it may concern:*

Be it known that I, GEORGE WIARD, a citizen of the United States, residing at Batavia, in the county of Genesee and State of New York, have invented new and useful Improvements in Horse Hay-Rakes, of which the following is a specification.

This invention relates to horse hay-rakes in which the rake-teeth are adjustable toward and from the ground.

My invention has for its principal object to render the rake-teeth vertically adjustable without changing the position of their points with reference to the ground, thus maintaining the teeth in the most favorable position for properly raking up the hay.

The invention has the further object to improve the dumping or discharging mechanism of the rake, so that the extent to which the rake-teeth are elevated in dumping may be regulated in accordance with the character of the hay.

In the accompanying drawings, consisting of two sheets, Figure 1 is a sectional elevation of a horse hay-rake provided with my improvements. Fig. 2 is a fragmentary top plan view of the machine with a portion of the rake-head in section. Fig. 3 is a top plan view of the machine with the seat-support in section. Fig. 4 is a fragmentary longitudinal section showing the manner of supporting the vertically-adjustable rake-head. Fig. 5 is a vertical section in line $x$ $x$, Fig. 1, on an enlarged scale.

Like letters of reference refer to like parts in the several figures.

A represents the axle; B, the wheels; C, the thills; C', the cross-piece connecting the thills in front of the axle and to which the whiffle-trees are attached; C², a longitudinal bar extending from the axle to the cross-piece, and D the cross-beam arranged behind the axle and to which the clearer-sticks are secured. The axle turns in bearings $a$, secured to the rear ends of the thills C and the longitudinal bar C², and these bearings are provided with rearwardly-extending arms or brackets, to which the cross-beam D is secured.

F represents the transverse bar or rod of the rake-head, G the teeth, and $g$ the spacing-spools arranged upon said rod, and to which the teeth are attached.

H represents the rider-bar, having the usual vertical slots for the passage of the rake-teeth, and I are the arms pivoted upon the axle and carrying the rake-head and the rider-bar.

The carrying-rod F, rider-bar H, and pivoted arms I constitute the dumping-frame of the hay-rake. The carrying-rod F passes through curved or upright slots $i$, formed in the pivoted arms I, and is supported in vertical adjustable brackets J, arranged upon the arms I. These adjustable brackets each consist of an arm or bar pivoted at one end to the carrying-arm I by a horizontal bolt $j$, and having its opposite end adjustably attached to the carrying-arm by a horizontal bolt $j'$ which passes through one of an upright series of holes $k$, formed in the bracket concentrically with the pivot-bolt $j$, as clearly represented in Figs. 1 and 4. Upon adjusting the brackets J up or down, by placing the bolts $j'$ in a higher or lower set of openings in the arms I the rake-teeth take part in this movement, and their points are elevated above the ground accordingly. When the hay to be raked is coarse timothy, it is necessary to raise the teeth farther from the ground than when the hay is fine or has been rained on. At the same time it is desirable that the points of the teeth should always occupy a horizontal or nearly horizontal position, as they pick up the hay in a cleaner manner in that position than when they are more or less inclined or nearly vertical, the teeth in the latter position having a dragging action instead of the more desirable scooping action.

Prior to my invention rake-teeth have usually been adjusted by swinging the teeth on their pivots or by means of the pivoted dumping-frame; but this manner of adjusting the teeth is objectionable, because in raising the teeth their points assume a more or less inclined position, according to the height to which they are elevated. By adjusting the rake-carrying bar up or down on the dumping-frame independently of the latter, instead of adjusting the same by a swinging movement, the position of the points of the teeth with reference to the ground remains practically unchanged, thus maintaining the points of the teeth in a substantially horizontal position in all adjustments of the same.

The spacing-spools $g$, adjacent to the brackets J, fit against the inner sides of the brackets, and the inner portions of the latter opposite the slots of the pivoted arms are preferably countersunk into said slots, as represented in Fig. 2, to form depressions $j^2$, which receive the ends of the adjacent spacing-spools.

L represents a ratchet-wheel secured to the axle of the machine, and M is a pawl attached to the dumping-frame of the rake and adapted to engage with the ratchet-wheel in a well-known manner to cause the dumping-frame to swing upwardly and forwardly and elevate the teeth above the pile of hay gathered in front of the teeth. The pawl M is preferably pivoted to the front portion of a housing M′, which incases the ratchet-wheel and is secured to the frame, the housing being capable of swinging upon the axle or other supporting-pivot. The pawl is interlocked with the ratchet-wheel by means of a foot-lever N, pivoted upon the draft-frame and having its lower arm connected with the pawl by a rod $n$.

$n'$ is a spring secured within the housing M′ and bearing against a nose $n^2$ at the inner end of the pawl, so as to hold the pawl out of engagement with the ratchet-wheel. The pawl is provided with a cam or releasing-finger $n^3$, which strikes a stop $o$, secured to the beam D, in the path of the releasing-finger, whereby the pawl is disengaged from the ratchet-wheel when the rake-teeth have been elevated, so as to allow the latter to descend to their operative position by gravity. The stop $o$ is made adjustable with reference to the pawl, so that the pawl may be released after having been in engagement with the ratchet-wheel during a greater or less portion of its rotation, and thereby cause the rake-teeth to be raised to any desired height in dumping. The adjustable stop preferably consists of a curved horizontal plate, which rests with its upper side against the under side of a plate P, which latter is curved to conform to the upper contiguous surface of the stop. The plate P is provided at its front end with a shoulder $p$, which bears against the front side of the beam D, and the stop and said plate are secured to the cross-beam D by a vertical bolt $q$, passing through a hole in the plate and a longitudinal slot $o'$ in the stop. The latter is prevented from twisting on the plate P by upwardly-projecting side flanges $p'$, formed on the stop and bearing against opposite edges of the plate P. The stop-plate is preferably stiffened by reenforcing ribs $o^2$. Upon loosening the nut of the bolt $q$ the stop-plate can be adjusted backwardly or forwardly, and after making the adjustment the nut is again tightened.

In raking light or short hay only a small quantity is gathered at a time, and it is therefore only necessary to elevate the teeth sufficiently to clear the collected pile, and not to their highest position, as is necessary when the hay is long and a large quantity is gathered at a time. As the machine continues its onward movement during the rising and falling movements of the rake, it is desirable to lower the rake to its working position as quickly as possible after its teeth have cleared an accumulated pile. By making the stop adjustable the pawl may be released when the points of the teeth have reached any desired elevation within certain limits, thus obviating any unnecessary motion of the rake.

I claim as my invention—

1. In a horse hay-rake, the combination, with the dumping-frame and the rake-teeth, of the rake-head carrying the teeth, and brackets supporting the rake-head and pivoted at one end to the dumping-frame and adjustably secured thereto at their opposite ends, substantially as set forth.

2. In a horse hay-rake, the combination, with the dumping-frame provided with pivoted arms having an upright series of openings, of adjustable brackets pivoted at one end to said arms and provided at their opposite ends with an adjustable bolt arranged in one of the openings of the pivoted arms, and a rake-head supported upon said adjustable brackets, substantially as set forth.

3. In a horse hay-rake, the combination, with the dumping-frame provided with pivoted arms having curved or upright slots, of the rake-teeth, a rod passing through the slots of the pivoted arms of the dumping-frame and having spools to which the teeth are attached, and adjustable brackets attached to said pivoted arms and supporting said rod, substantially as set forth.

4. In a horse hay-rake, the combination, with the axle, the ratchet-wheel mounted thereon, and the cross-beam arranged behind the axle, of the dumping-frame having a pawl which engages with the ratchet-wheel, a slotted stop-plate having side flanges and secured to said cross-beam by a vertical bolt passing through its slot, and a plate interposed between the stop-plate and the cross-beam and provided with a shoulder bearing against the front side of the cross-beam, substantially as set forth.

Witness my hand this 20th day of February, 1891.

GEORGE WIARD.

Witnesses:
W. W. CALLEN,
JOHN W. PRATT.